United States Patent

Nishiyama

[11] Patent Number: 5,144,509
[45] Date of Patent: Sep. 1, 1992

[54] DOUBLE-SIDE MAGNETIC RECORDING-REPRODUCING APPARATUS WITH FIXED POSITION MAGNETIC HEADS

[75] Inventor: Tomoyuki Nishiyama, Tokyo, Japan

[73] Assignee: Fuji Photo Film Co., Ltd., Kanagawa, Japan

[21] Appl. No.: 354,340

[22] Filed: May 19, 1989

[30] Foreign Application Priority Data

May 23, 1988 [JP] Japan ................. 63-125363

[51] Int. Cl.$^5$ .............................................. G11B 5/54
[52] U.S. Cl. ................................... 360/105; 360/97.01
[58] Field of Search .............. 360/97.01, 99.01, 104, 360/105, 106; 369/244, 263, 264

[56] References Cited

U.S. PATENT DOCUMENTS 4,887,176 12/1989 Dussinger et al. ................. 360/105

FOREIGN PATENT DOCUMENTS 52-73709 6/1977 Japan .

Primary Examiner—David J. Severin
Attorney, Agent, or Firm—Sughrue, Mion, Zinn, Macpeak & Seas

[57] ABSTRACT

A double-side magnetic recording-reproducing apparatus, wherein a top magnetic head and a bottom magnetic head are respectively provided upwardly and downwardly of a magnetic recording medium to be rotated by a spindle motor, and magnetic recording on the both surfaces of the magnetic recording medium or magnetic reproducing therefrom is performed. An actuator for vertically moving the spindle motor and the magnetic recording medium, respectively, is provided, the side of the magnetic recording medium is vertically moved by the actuator, and the top magnetic head or the bottom magnetic head is selectively brought into contact with the top surface or the undersurface of the magnetic recording medium.

6 Claims, 3 Drawing Sheets

DOUBLE-SIDE MAGNETIC RECORDING-REPRODUCING APPARATUS WITH FIXED POSITION MAGNETIC HEADS

BACKGROUND OF THE INVENTION

1. Field of the Invention

The present invention relates to a double-side magnetic recording reproducing apparatus, and more particularly to a double-side magnetic recording-reproducing apparatus wherein magnetic recording is performed on both sides of a rotating magnetic recording medium or reproduction is performed therefrom.

2. Description of the Related Art

The double-side magnetic recording-reproducing apparatus has heretofore been used as an apparatus wherein video signals obtained by still photographing with an electronic still camera are magnetically recorded on a magnetic recording medium or reproduced therefrom, and a flexible magnetic sheet contained in a pack is used as the magnetic recording medium. Furthermore, a top magnetic head and a top regulator plate are provided upwardly of the video floppy and a bottom magnetic head and a bottom regulator plate are provided downwardly of the video floppy. Incidentally, the regulator plates are adapted to regulate the surfaces of the magnetic sheet so that the magnetic heads can satisfactorily slide on the magnetic sheet.

Switching of the surfaces of the magnetic recording or reproducing has heretofore been performed such that the top magnetic head and the top regulator plate, and the bottom magnetic head and the bottom regulator plate are selectively moved in the vertical direction (Refer to Laid-open Japanese Patent Application (Tokkai) No. 62-1168).

However, positions and postures of the magnetic heads and regulator plates with respect to the magnetic sheet of a video floppy are very delicate. Therefore, in a system for switching the surfaces of the recording or reproducing, wherein the magnetic heads and regulator plates are vertically moved, it is difficult to design a positioning mechanism for obtaining satisfactory head touch, and further, since the magnetic heads are fed in the radial direction of the magnetic sheet, a mechanism for vertically moving the magnetic heads must be added to this head-feeding mechanism, thereby presenting a problem of complicated construction.

SUMMARY OF THE INVENTION

The present invention has been developed to obviate the above-described disadvantages of the related art and has as its object the provision of a double side magnetic recording-reproducing apparatus capable of easily achieving a positioning accuracy between the magnetic recording medium and the magnetic heads, etc. in switching the surfaces of magnetic recording or reproducing, and being simplified in construction.

To solve the above-described problems, the invention features that, in the double-side magnetic recording-reproducing apparatus wherein the top magnetic head and the bottom magnetic head are respectively provided upwardly and downwardly of the magnetic recording medium rotated by a spindle motor, and magnetic recording or reproducing is performed on the both surfaces of the magnetic recording medium with these magnetic heads, an actuator for vertically moving the spindle motor and the magnetic recording medium, respectively, is provided, the side of the magnetic recording medium is vertically moved with the actuator, and the top magnetic head or the bottom magnetic head is selectively brought into sliding contact with the top surface or bottom surface of the magnetic recording medium.

According to the invention, the side of the magnetic heads are not moved vertically, and the side of the magnetic recording medium, i.e. the magnetic recording medium and the spindle motor for rotating the magnetic recording medium are vertically moved. With this arrangement, as compared with a mechanism for vertically moving the side of the magnetic heads, the positioning accuracy can be easily achieved and the apparatus can be simplified in construction.

BRIEF DESCRIPTION OF THE DRAWINGS

The exact nature of this invention, as well as other objects and advantages thereof, will be readily apparent from consideration of the following specification relating to the accompanying drawings, in which like reference characters designate the same or similar parts throughout the figures thereof and wherein.

DETAILED DESCRIPTION OF THE INVENTION

Detailed description will hereunder be given of a preferred embodiment of the double side magnetic recording-reproducing apparatus according to the present invention with reference to the accompanying drawings.

Figure 4:
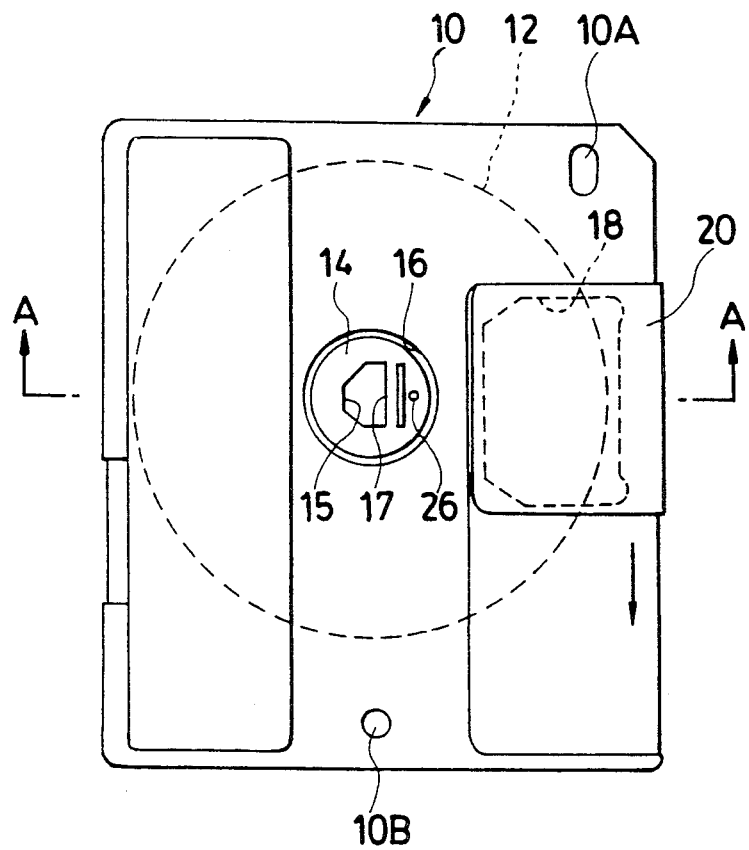
FIG. 4 is a plan view of the video floppy.
Figure 5:
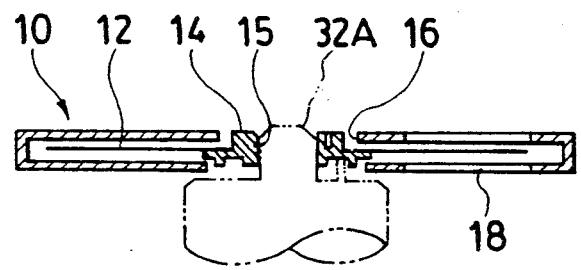
FIG. 5 is a sectional view taken along the line A—A in FIG. 4.

First, description will be given of a magnetic recording medium (video floppy) applied to the double-side magnetic recording-reproducing apparatus. FIG. 4 is the plan view of this video floppy 10, and FIG. 5 is the sectional view taken along the line A—A in FIG. 4.

As shown in FIG. 4, the video floppy 10 is formed into a generally square shape and a magnetic sheet 12 for recording still picture image information and the like is rotatably housed in the video floppy 10. A center core 14 as being a reinforcing member is provided in the central portion of the magnetic sheet 12 and projected to the outside from a circular opening 16 of the video floppy 10. This center core 14 is formed with a center hole 15 which is formed with an elastic piece 17. The center hole 15 of the center core 14 is coupled onto a driving shaft 32A to be described hereunder against a biasing force of this elastic piece 17 (Refer to FIG. 5).

The video floppy 10 is formed with a window 18, at which is positioned a magnetic head to be described hereunder. This window 18 is opened or closed by a slidable shutter 20. More specifically, the shutter 20 closes the window 18 to prevent dust from adhering to the magnetic sheet 12 before the video floppy 10 is inserted into a floppy holder to be described hereunder, and is engaged with a pawl provided on the floppy holder, when the video floppy 10 is inserted into the floppy holder, to move downwardly in FIG. 4 for opening the window 18. Further, the video floppy 10 has positioning holes 10A and 10B for positioning the video floppy 10 to a position for magnetic recording or reproducing.

Figure 1:
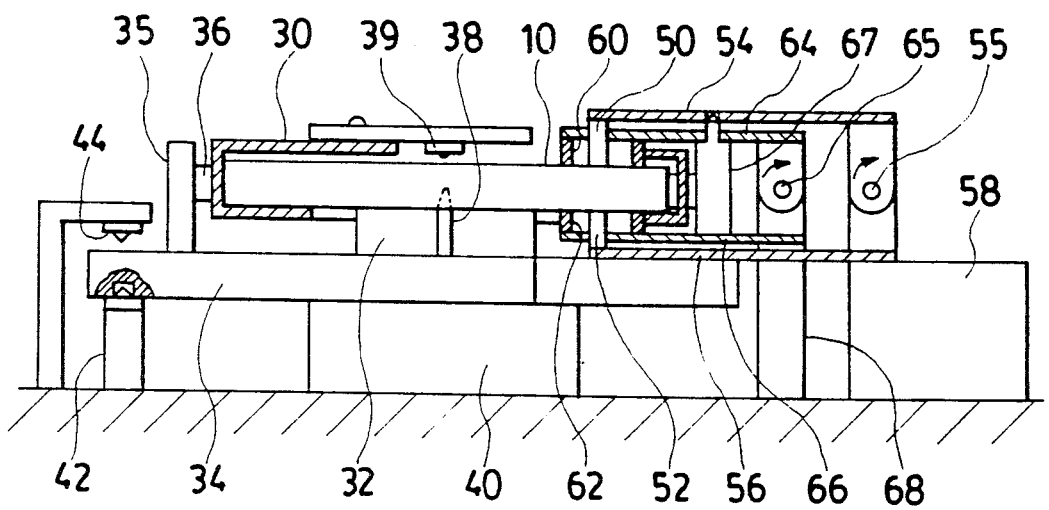
FIG. 1 is a partially sectional front view showing one embodiment of the double-side magnetic recording-reproducing apparatus according to the invention.
Figure 2:
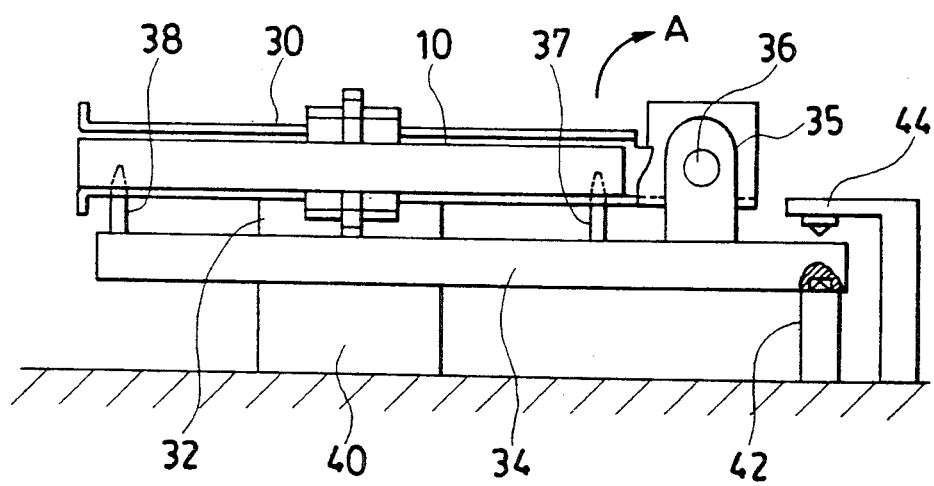
FIG. 2 is a side view of FIG. 1.

FIG. 1 is the partially sectional front view showing one embodiment of the double-side magnetic recording-reproducing apparatus according to the invention. FIG. 2 is the side view thereof. This double-side magnetic recording-reproducing apparatus is mainly constituted by: a baseplate 34 supporting a floppy holder 30, a spindle motor 32 and the like; a vertically driving actuator 40 for vertically moving the baseplate 34; a bottom baseplate receiver 42 and a top baseplate receiver 44 for positioning the height of the baseplate 34; a top magnetic head 50 and a bottom magnetic head 52; a head-feeding actuator 58; and a top regulator plate 60 and a bottom regulator plate 62 for regulating the surfaces of the magnetic sheet 12.

The floppy holder 30 is provided for housing the video floppy 10 and positioning it to a predetermined position, and is rotatably provided on a pivot 36 formed on a holder rotary pivot receiver 35 on the baseplate 34. The video floppy 10 is inserted into the floppy holder 30 when the holder 30 is opened (when the floppy holder 30 is at a predetermined rotary position in a direction indicated by an arrow A in FIG. 2). The positioning hole 10A and 10B are coupled onto positioning pins 37 and 38 on the baseplate 34 for positioning and the magnetic sheet 12 in the video floppy 10 is coupled onto the driving shaft 32A of the spindle motor 32 as shown in FIG. 3 when the floppy holder 30 is closed (in the state illustrated in FIGS. 1 and 2).

Additionally, when coupled onto this driving shaft 32A, the magnetic sheet 12 is attracted by a magnet, not shown, on the side of the driving shaft 32A.

Furthermore, provided on the floppy holder 30 is a PG sensor 39 which produces pulse signals each time a magnetic generating portion 26 (Refer to FIG. 4) provided on the center core 14 of the magnetic sheet 12 comes to a detecting position. The pulse signals are used for detecting the rotary phase of the magnetic sheet 12.

The spindle motor 32 is provided on the baseplate 34, and rotates the magnetic sheet 12 mounted on the driving shaft 32A of the spindle motor 32 as shown in FIG. 3, at high speed during the magnetic recording or reproducing.

The vertically moving actuator 40 is formed of one such for example as a piezo-electric actuator and vertically moves the baseplate 34 for switching the surfaces of recording or reproducing of the magnetic sheet 12 as will be described hereunder. The bottom baseplate receiver 42 and the top baseplate receiver 44 serve as stoppers for the baseplate 34, respectively, to position the height of the baseplate 34 during its vertical movement.

Description will hereunder be given of a magnetic recording-reproducing section.

The top magnetic head 50 and the bottom magnetic head 52 are provided at the forward end portions of a top head baseplate 54 and a bottom head baseplate 56, respectively, and the rear end portions of the top head baseplate 54 and bottom head baseplate 56 are fixed to a head feeding actuator 58. The head-feeding actuator 58 feeds the top and bottom magnetic heads 50 and 52 in the radial direction of the magnetic sheet 12 via the top and bottom head baseplates 54 and 56.

A top regulator plate 60 and a bottom regulator plate 62 are provided on a top regulator plate baseplate 64 and a bottom regulator plate baseplate 66, respectively, and the top and bottom regulator plate baseplates 64 and 66 are fixed to a receiver member 68.

The top head baseplate 54 and the top regulator plate baseplate 64 are rotatably supported by pivots 55 and 65, respectively, and are positioned to predetermined positions, respectively, by a positioning shaft 67 on the bottom regulator plate baseplate 66 during the magnetic recording and reproducing as shown in FIG. 1.

Description will hereunder be given of action of the double-side magnetic recording-reproducing apparatus with the above-described arrangement.

First, the top head baseplate 54 and the top regulator plate baseplate 64 are rotated in the clockwise direction in FIG. 1, respectively, thereafter, the floppy holder 30 is opened and the video floppy 10 is inserted into the floppy holder 30. Subsequently, the floppy holder 30 is closed, whereby the video floppy 10 is positioned and the magnetic sheet 12 in the video floppy 10 is mounted onto the driving shaft 32A of the spindle motor 32, and thereafter, the top head baseplate 54 and the top regulator plate baseplate 64 are rotated and positioned to the positions of the magnetic recording or reproducing.

Figure 3A:
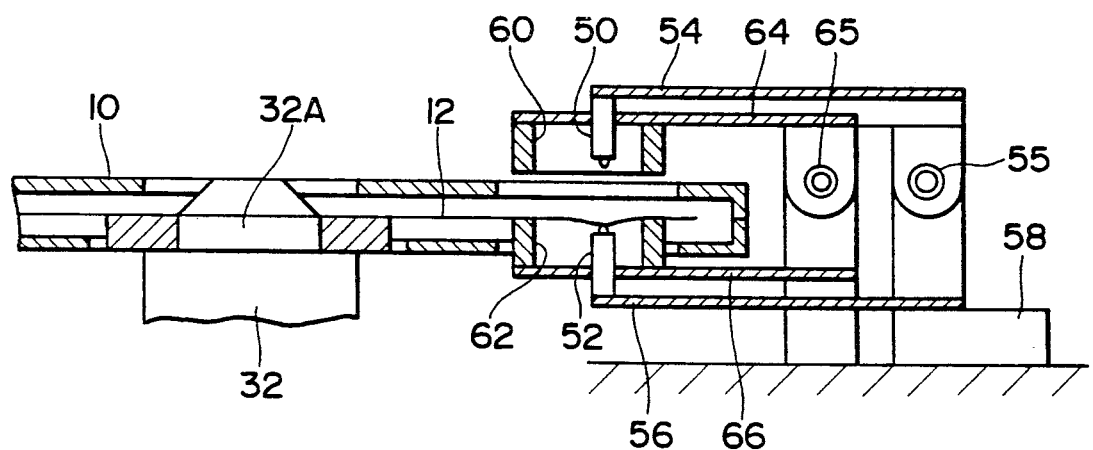
FIGS. 3(A) and 3(B) are sectional views of the essential portions of FIG. 1, showing the switched states of the surfaces of recording or reproducing, respectively.

Now, if the magnetic sheet 12 is rotated by the spindle motor 32 in a state where the baseplate 34 is moved downwardly and the height of the baseplate is positioned as shown in FIGS. 1 and 2, the undersurface of the magnetic sheet 12 is regulated by the bottom regulator plate 62 as shown in FIG. 3(A) and the bottom magnetic head 52 can be brought into contact with the undersurface of the magnetic sheet 12. Still picture image information and the like are recorded on or reproduced from the undersurface of the magnetic sheet 12 by this bottom magnetic head 52.

Figure 3B:
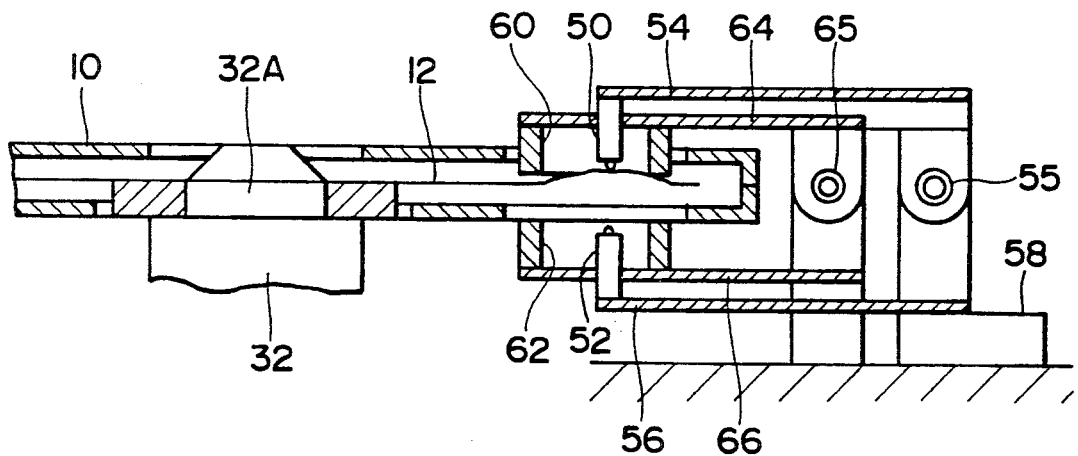

Next, in order to switch the surfaces of the magnetic recording or reproducing, the baseplate 34, spindle motor 32, video floppy 10 and the like should be raised by the vertically moving actuator 40. Additionally, the height of the baseplate 34 is positioned with high accuracy by the top baseplate receiver 44. When the magnetic sheet 12 is rotated by the spindle motor 32 in the above-described state, the top surface of the magnetic sheet 12 is regulated by the top regulator plate 60 and the top magnetic head 50 can be brought into contact with the top surface of the magnetic sheet 12 as shown in FIG. 3(B).

Incidentally, in this embodiment, the spindle motor 32 is vertically moved together with the video floppy 10. However, if there is an allowance within which the magnetic sheet 12 can vertically move by a predetermined value in the video floppy 10, only the spindle motor 32, i.e. only the spindle motor 32 and magnetic sheet 12 mounted on the driving shaft 32A may be vertically moved. Furthermore, the present invention is not limited to the application to the video floppy 10, but is applicable to any one as far as it is a magnetic recording medium in which magnetic recording can be performed on the both surfaces thereof or reproducing can be performed therefrom.

As has been described hereinabove, in the double-side magnetic recording-reproducing apparatus according to the invention, switching of the surfaces of magnetic recording or reproducing is performed by vertically moving the side of the magnetic recording medium, i.e. the magnetic recording medium and the spindle motor for rotating the magnetic recording medium, so that the positioning accuracy can be easily achieved and the apparatus can be simplified in construction as compared with the mechanism in which the side of magnetic head is vertically moved.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A double-side magnetic recording-reproducing apparatus comprising:
   a spindle motor having a driving shaft mounted thereon with a magnetic recording medium, for rotating said magnetic recording medium mounted on the driving shaft thereof;
   a top magnetic head and a bottom magnetic head, which are arranged at predetermined distances above and below respectively, said magnetic recording medium mounted on the driving shaft of said spindle motor;
   a head-feeding means for moving the top and bottom magnetic heads in a radial direction of said magnetic recording medium; and
   a means for switching surfaces of magnetic recording or reproducing, for vertically moving upwardly or downwardly said spindle motor by a predetermined value to selectively bring either a top surface of said magnetic recording medium mounted on the driving shaft of said spindle motor into contact with the top magnetic head or an undersurface of said magnetic recording medium into contact with the bottom magnetic head, respectively.

2. The double-side magnetic recording-reproducing apparatus as set forth in claim 1, wherein said switching means includes:
   a baseplate for supporting said spindle motor;
   an actuator for vertically moving said baseplate; and
   a member for positioning a top position and a bottom position of said baseplate.

3. The double-side magnetic recording-reproducing apparatus as set forth in claim 1, wherein said magnetic recording medium is a flexible magnetic disc rotatably housed in a pack.

4. The double-side magnetic recording-reproducing apparatus as set forth in claim 3, including a top regulator plate and a bottom regulator plate, which are arranged at predetermined distances upwardly and downwardly of said flexible magnetic disc mounted on the driving shaft of said spindle motor, said top regulator plate for regulating the top surface of said flexible magnetic disc during magnetic recording on or reproducing from the top surface, and said bottom regulator plate for regulating the undersurface of said flexible magnetic disc during magnetic recording on or reproducing from the under surface.

5. A double-side magnetic recording-reproducing apparatus wherein a top magnetic head and a bottom magnetic head are respectively provided above and below, respectively, a magnetic recording medium to be rotated by a spindle motor, and magnetic recording on or magnetic reproducing from both surfaces of said magnetic recording medium is performed, an actuator for vertically moving said spindle motor and said magnetic recording medium, simultaneously, is provided, vertically moving said spindle motor and said magnetic recording medium upwardly or downwardly by said actuator selectively brings said top magnetic head into contact with the top surface of said magnetic recording medium or said bottom magnetic head into contact with the undersurface of said magnetic recording medium, respectively.

6. Apparatus for accessing both sides of a storage medium, said apparatus comprising:
   a drive spindle for supporting the storage medium for rotation about a drive axis;
   first and second transducers supported relative to opposite sides of the medium; and
   means for moving said drive spindle and the medium therewith of said drive axis between two playing positions, the first playing position disposing the medium in operative relation with said first transducer and the second playing position disposing the medium in operative relation with said second transducer.

* * * * *